United States Patent [19]

Nakatsu et al.

[11] Patent Number: 5,062,007

[45] Date of Patent: Oct. 29, 1991

[54] DIGITAL SIGNAL MAGNETIC RECORDING/REPRODUCING APPARATUS

[75] Inventors: Etsuto Nakatsu, Neyagawa; Hiroaki Shimazaki, Moriguchi; Toyohiko Matsuta; Masafumi Shimotashiro, both of Neyagawa; Masaaki Kobayashi, Kawanishi, all of Japan

[73] Assignee: Nissan Motor Company, Limited, Kanagawa, Japan

[21] Appl. No.: 450,997

[22] Filed: Dec. 15, 1989

[30] Foreign Application Priority Data

Dec. 16, 1988 [JP] Japan .................................. 63-319014

[51] Int. Cl.$^5$ .......................... G11B 20/06; G11B 5/09
[52] U.S. Cl. ......................................... 360/29; 360/46
[58] Field of Search ........................ 360/29, 32, 46, 65

[56] References Cited

U.S. PATENT DOCUMENTS

4,547,817 10/1985 Klaassen ............................... 360/29

OTHER PUBLICATIONS

"Signal System Design for a Digital Video Recording System"; L. Gallo; SMPTE J., 86:749–756, Oct. 1977.
"An Experimental Digital Video Recording System"; L.M.H.E. Dreissen et al.; IEEE Conf., Jun. 1986.
"An Experimental Digital VTR Capable of 12-Hour Recording"; C. Yamamitsu et al.; IEEE Trans. on CE, CE-33, No.3, pp. 240–248, 1987.

*Primary Examiner*—Vincent P. Canney
*Attorney, Agent, or Firm*—Lowe, Price, LeBlanc & Becker

[57] ABSTRACT

A digital signal magnetic recording/reproducing apparatus converts a digital signal into a multi-value digital signal, followed by recording/reproducing the quadrature biphase modulated multi-value quadrature amplitude modulated signal. By using a multi-value quadrature amplitude modulation, a direct current component in the recorded signal can be eliminated, and the utilization efficiency of the recording frequency band of the digital signal magnetic recording/reproducing apparatus can be improved. Also, with respect to the amplitude non-linear characteristic which occurs in the magnetic recording/reproducing process, by providing a compensating circuit during the mapping before recording or after reproducing and demodulating, the deterioration of the S/N ratio of the reproduced and demodulated signal can be reduced to decrease the errors in the decoded data. Furthermore by bias-recording the multi-value quadrature amplitude modulation signal, the non-linearity of the electromagnetic conversion system is alleviated to decrease the deterioration of the S/N ratio due to distortion, thereby making the application of the modulation scheme more reliable.

10 Claims, 9 Drawing Sheets

DIGITAL SIGNAL MAGNETIC RECORDING/REPRODUCING APPARATUS

BACKGROUND OF THE INVENTION

1. Field of the Invention

The present invention relates to a digital signal magnetic recording/reproducing apparatus for recording and reproducing digital signals on a magnetic recording medium such as a video tape recorder (DVTR) or the like.

2. Description of the Prior Art

In conventional digital signal magnetic recording/reproducing apparatuses, due to the difficulty of recording/reproducing the direct current component, baseband modulation techniques having a lower direct current component in the recording signals have been used, such as NRZ codes (e.g., J. K. R. Heitmann "An Analytical Approach to the Standardization of Digital Video Tape Recorder", SMPTE J., 91.3, March 1982, or J. K. R. Heitmann "Digital Video Recording, New Result in Channel Coding and Error Protection", SMPTE J., 93:140-144, February 1984), 8-10 block codes (e.g., J. L. E. Baldwin "Digital Television Recording with Low Tape Consumption", SMPTE J., 88:490-492, July, 1979), Miller-square (M2) codes (e.g., L. Gallo "Signal System Design for a Digital Video Recording System", SMPTE J., 86:749-756, October 1977), ternary partial response system, etc.

However, in the digital signal magnetic recording/reproducing apparatuses utilizing such baseband modulation techniques, due to the basic system of recording the binary signals, the utilization efficiency of the recording frequency band (transmissible bit rate per unit band) is low. For instance, assuming the roll-off rate of the nyquist transmission system to be 0.5, the utilization efficiency of the frequency band is at most 1.33 bits/sec./Hz. This incurs an increased tape consumption making it difficult to record for long time periods. Furthermore, in order to increase the recording rate, a method of expanding the recording frequency band, a method of increasing the number of recording channels, or a method of increasing the relative velocity have been considered. However, if the recording frequency band is expanded, the S/N ratio is greatly deteriorated. Accordingly, the recording rate cannot be increased very much. When the number of recording channels is increased, the track width is narrowed and the S/N ratio is deteriorated. If the relative velocity is increased, the amount of tape consumption naturally comes into question.

To the deterioration of the S/N ratio, the error rate may be improved by using the error control coding. However, the bit rate of the data which can be actually recorded is lost by such coding (Ref. L. M. H. E. Dreissen et al., "An Experimental Digital Video Recording System", IEEE Conf. June 1986, or C. Yamamitsu et al., "An Experimental Digital VTR Capable of 12-hour Recording", IEEE Trans. on CE, CE-33, No. 3, pp 240-248, 1987).

On the other hand, there has been proposed a coded modulation scheme made by combining a multi-value modulation scheme, which shows a high utilization efficiency of the frequency band, with an error control coding for application to digital data transmission. This, however, does not give consideration to the special conditions such as the effects of non-linear distortion or the effects of saturation characteristics in the case of recording/reproducing on a magnetic recording medium (cf. G. Ungerboeck "Channel Coding with Multilevel/Phase Signals", IEEE Trans. on IT, IT-28, No. 1, pp. 55-67, 1982).

The present invention have already invented, as shown in U.S. patent application Ser. No. 07/251,094 (Sept. 29, 1988), a digital magnetic recording/reproducing apparatus using a multi-value modulation scheme which shows high frequency utilization efficiency and high recording rate. However, such apparatus gives no consideration on the effect of the amplitude non-linear characteristic which occurs in the process of magnetic recording and reproducing.

SUMMARY OF THE INVENTION

An object of the present invention is to provide a digital signal magnetic recording/reproducing apparatus using a multi-value modulation scheme which shows a high recording efficiency with a low error rate of the reproduced data.

In order to attain the above object, a digital signal magnetic recording/reproducing apparatus of the present invention comprises: a non-linear mapping means for producing two channel signals showing a predetermined point mapped in a constellation corresponding to a value of an input digital data, the predetermined point having been mapped to have an inverse characteristic with respect to non-linear amplitude characteristics of a magnetic head and magnetic recording medium system included in a subsequent signal path; a carrier generating means for generating a carrier; an amplitude phase modulation means for subjecting the two channel outputs of said mapping means to quadrature biphase modulation using said carrier to generate a modulated signal; a magnetic recording/reproducing means for recording said modulated signal on a magnetic recording medium, and for reproducing the recorded signal; a carrier reproducing means for reproducing a carrier from the reproduced signal from said magnetic recording/reproducing means; a demodulation means for demodulating the reproduced signal from said magnetic recording/reproducing means using the carrier reproduced by said carrier reproducing means; and a decoding means for decoding an output of said demodulation means to obtain a reproduced digital data output.

By the above construction, by effecting a mapping processing so as to first compensate for the non-linear amplitude characteristics caused by the magnetic recording and reproducing process prior to recording, it is possible to reduce the deterioration of S/N ratio of the reproduced demodulated signal caused by the non-linear amplitude characteristics caused by the recording and reproducing process and to reduce the data errors after decoding.

DESCRIPTION OF THE PREFERRED EMBODIMENTS

Figure 1:
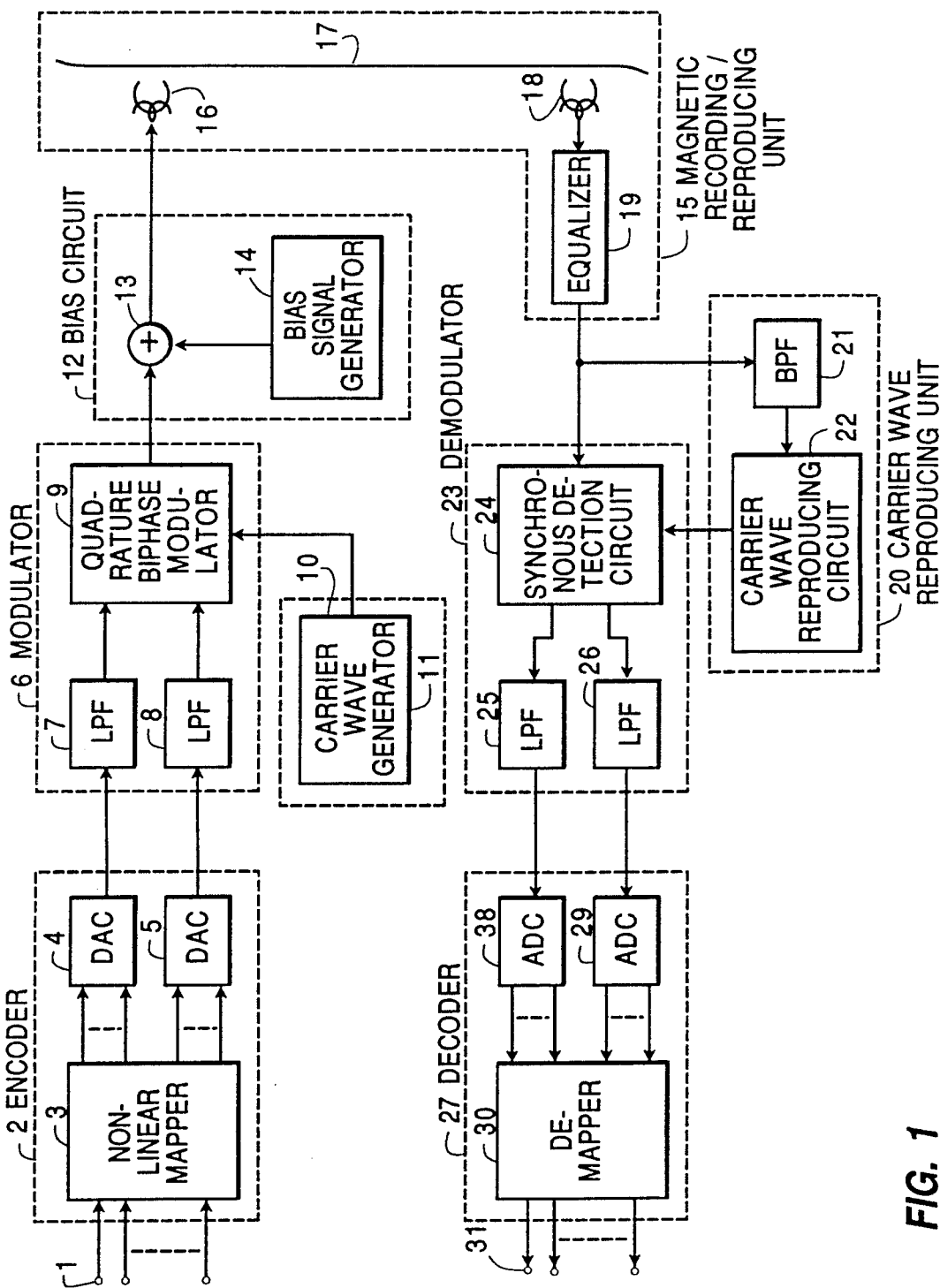
FIG. 1 is a block diagram of a digital signal magnetic recording/reproducing apparatus in accordance with one embodiment of the present invention.

In FIG. 1 a block diagram of a digital signal magnetic recording/reproducing apparatus in accordance with a first embodiment of the present invention is shown. A digital signal obtained by digitally converting the television signal, audio signal, or the like is inputted into the input terminal 1. The inputted digital signal is inputted into an encoder 2, and converted to a digital signal having two channel plural levels by the non-linear mapper 3 in the encoder 2 which are converted into multi-value digital signals by the Digital-Analog Converters (hereinafter referred to as DACs) 4 and 5.

Figure 2A:
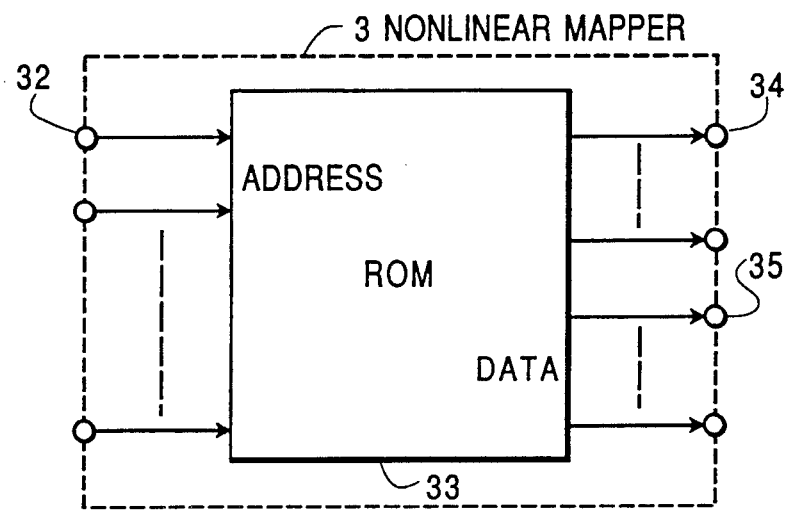
FIGS. 2a and 2b are block diagrams of a non-linear mapper 3 and a demapper 30 in the digital signal magnetic recording/reproducing apparatus of the present invention.

A concrete block diagram of the abovementioned non-linear mapper 3 is shown in FIG. 2a. For example, when the input from the input terminal 1 is 4 bits and the modulation scheme is 16 QAM (Quadrature Amplitude Modulation), a signal of 4 bits is inputted into the ROM 33 as an address signal. In the ROM 33 16 two channel I and Q signal combinations are stored, from which the I and Q signals corresponding to the inputted 4 bit signals are outputted to the output terminals 34 and 35.

Figure 3A:
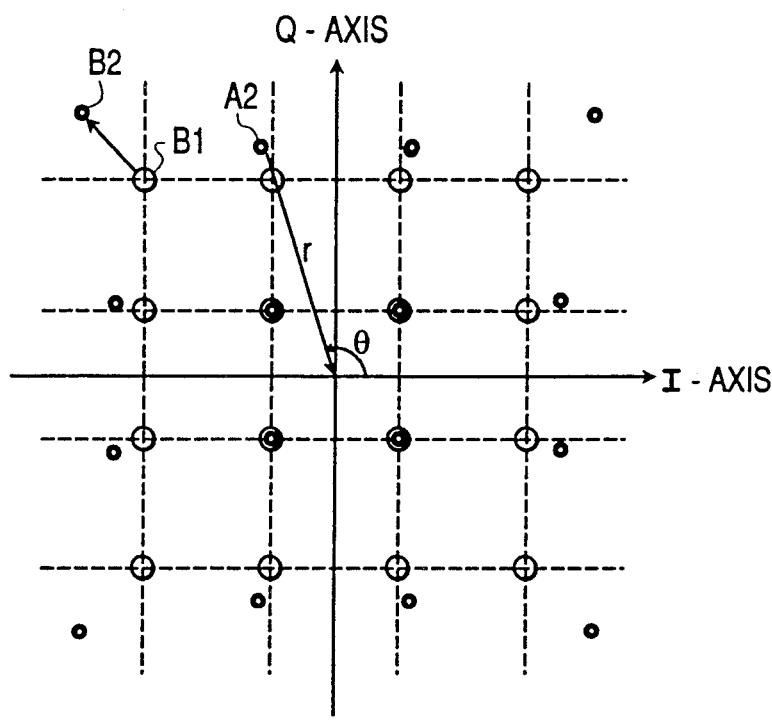
FIGS. 3a and 3b are conceptual views of a signal point arrangement during the non-linear mapper 3 in recording and the signal point position of the reproduced demodulated signal of the digital signal magnetic recording/reproducing apparatus of the present invention.
Figure 3B:
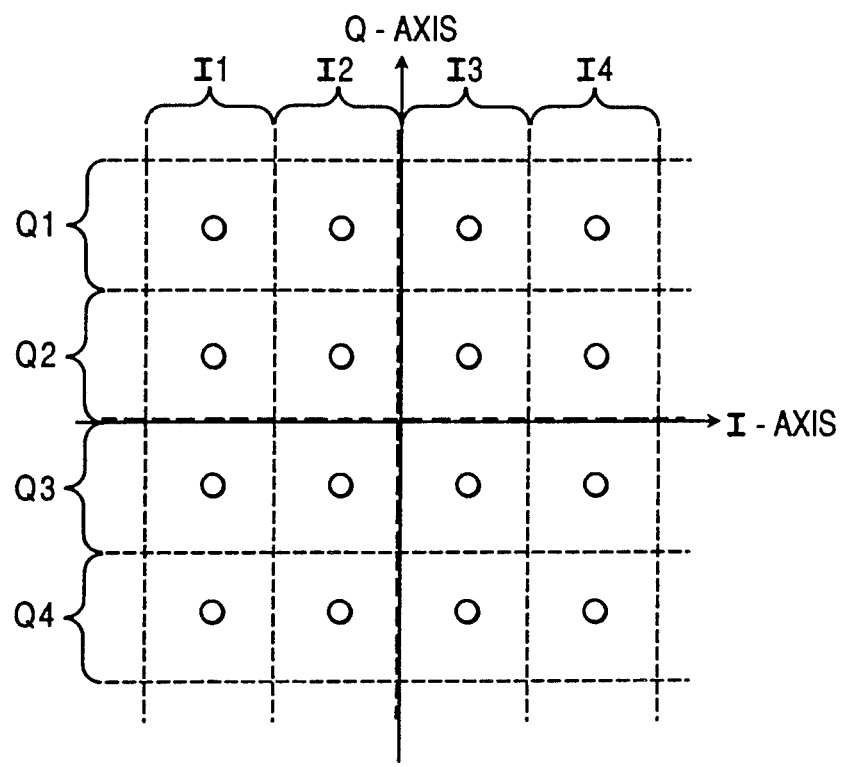
Figure 4:
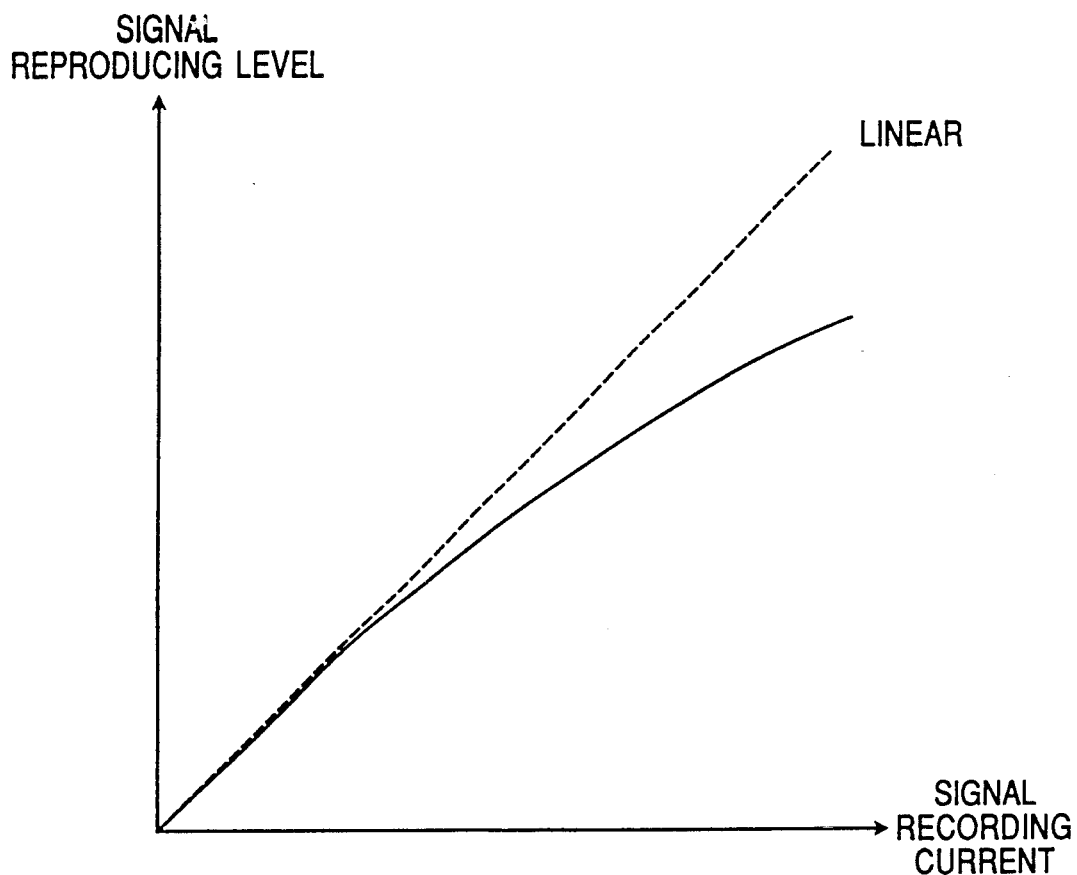
FIG. 4 is a conceptual view showing a non-linear amplitude characteristic which occurs during the magnetic recording/reproducing process.

The 16 combinations of the I and Q signals correspond to the 16 points which are shown for example by the solid black dots in FIG. 3a. The individual point has its amplitude and phase information. In the case of the point A2, the amplitude is r, and the phase is θ. Normally, the 16 points are set in a lattice form, i.e., at the positions of the open circles in FIG. 3a. However, in order to first correct the non-linear amplitude characteristics of the magnetic recording/reproducing process as shown in FIG. 4, a setting is made so that the point of the larger amplitude, i.e., the point farther than the basic points of the I and Q axes, is located at the farther position. For example, the point which normally should be set to the position of B1 is set to the position of B2 in anticipation of its distortion toward the basic point by the non-linear amplitude characteristics of the magnetic recording/reproducing process. By setting in this manner, the reproduced demodulated signal becomes the signal as shown by the open circles in FIG. 3b.

The outputs of DAC 4 and 5 are inputted to the modulator 6. In the modulator 6, the outputs from the inputted DACs 4 and 5 are respectively inputted to Low-Pass Filters (hereinafter referred to as LPFs) 7 and 8 and subjected to band limitations. The outputs of LPFs 7 and 8 are inputted to a quadrature biphase modulator 9, where they are subjected to quadrature biphase modulation using the carrier wave outputted from the carrier wave generator 11 in the carrier wave generating unit 10.

Figure 5A:
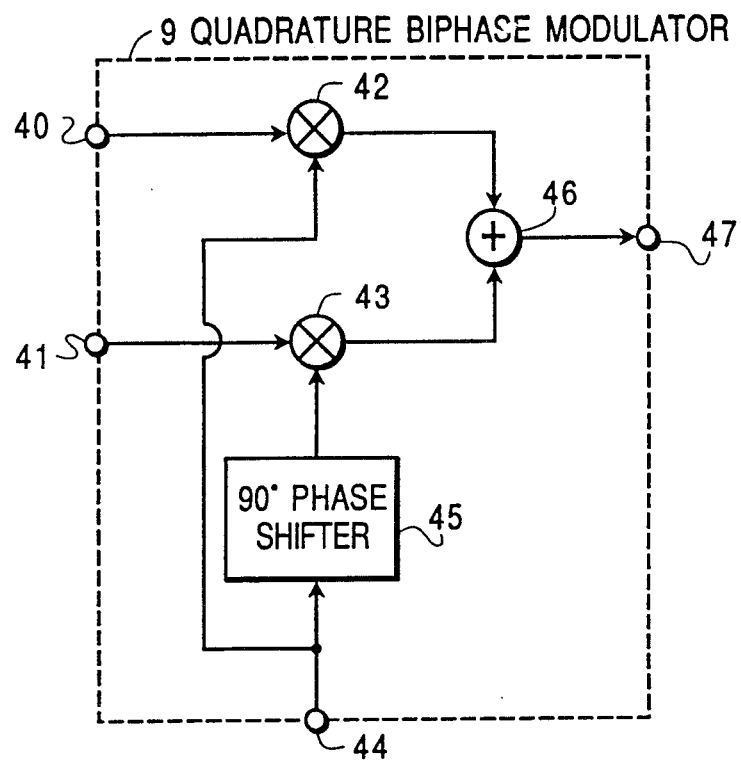
FIGS. 5a and 5b are block diagrams showing a quadrature biphase modulator 9 and a synchronous detection circuit 23 in the digital signal magnetic recording/reproducing apparatus of the present invention.

A concrete block diagram of the abovementioned quadrature biphase modulator 9 is shown in FIG. 5a. It is assumed that the output from the carrier wave generator 11 is $C(t) = A \cdot \cos \omega_c t$, and the outputs of LPFs 7 and 8 are $d_1(t)$ and $d_2(t)$. The signals $d_1(t)$ and $d_2(t)$ are the multi-value digital signals having an n level, in which n is an optional integer. (If the input bit number of the coder 2 is 4, there are 16 combinations of the outputs of LPFs 7 and 8.) The outputs $d_1(t)$ and $d_2(t)$ of LPFs 7 and 8 are respectively inputted to the balanced modulators 42 and 43 from the terminals 40 and 41. Also, the carrier wave C(t) inputted from the terminal 44 is inputted as such to the balanced modulator 42, and the other is subjected to 90° shifting of phase with a 90° shifter 45 and inputted to the balanced modulator 43 as $A \cdot \sin \omega_c t$. With the balanced modulators 42 and 43, the LPF output and the carrier wave are respectively multiplied and inputted to the adder 46. The output of the adder 46 is outputted from the terminal 47 as an output S(t) from the quadrature biphase modulator 9, namely, it becomes, as follows:

$$S(t) = d_1(t) \cdot A \cdot \cos \omega_c t + d_2(t) \cdot A \cdot \sin \omega_c t$$

Figure 6:
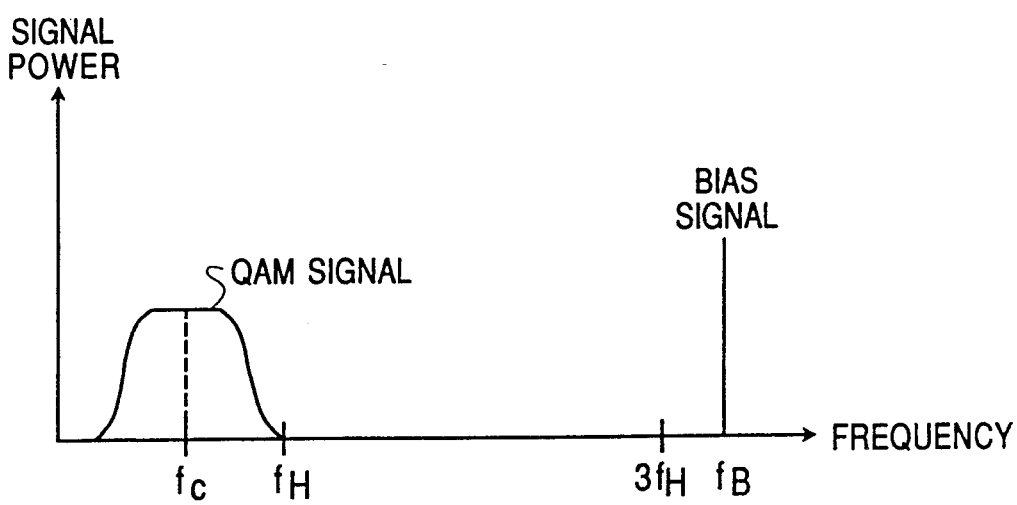
FIG. 6 is a conceptual view of a frequency spectrum of the recording signal during recording of the digital signal magnetic recording/reproducing apparatus of the present invention.

The output from the quadrature biphase modulator 9 is inputted to the bias circuit 12, and outputted with addition of the bias signal outputted from the bias signal generator 14 by the adder 13. The bias signal frequency $f_B$ with respect to the maximum frequency $f_H$ in the recording signal band is assumed to be: $f_B \geq 3 \cdot f_H$. This relationship is shown in FIG. 6. By this relationship, entry of the cross modulation component of $f_B - 2 \cdot f$ into the recorded signal band is prevented. (Here, f is an optional frequency in the recording signal band.) Furthermore, the bias current is set to maximize the amplitude of the reproduced signal. If the harmonic distortion becomes large with the so set bias current value, a setting may be made to the current value to maximize the composite S/N ratio including the harmonic distortion as noise. The output of the bias circuit 12 is inputted to the magnetic recording/reproducing unit 15 and recorded by the recording head 16 on the magnetic recording medium 17 (e.g., magnetic tape, magnetic disk, or the like).

The signal recorded on the magnetic recording medium 17 is output from the reproducing head 18 (which may be co-used as a recording head) and inputted to the equalizer 19 which has no group delay distortion. By the equalizer 19, the low-pass and the high-pass portions which were attenuated in the magnetic recording/reproducing process are accentuated to make the frequency characteristic in the magnetic recording/reproducing system nearly flat. The output of the equalizer 19 is inputted to the carrier wave reproducing unit 20 and the demodulator 23. In the carrier wave reproducing unit 20, the carrier wave component is extracted by the Band-Pass Filter (hereinafter referred to as a BPF) for passing the carrier wave frequency and inputted to the carrier wave reproducing circuit 22. The carrier wave reproducing circuit 22 reproduces the carrier wave using the method as shown for example in FIG. 17 of the article of G. Ungerboeck; Channel Coding with Multilevel/Phase Signals: IEEE Tran. on IT, IT-28, No. 1, pp. 56-67, 1982, given as reference literature, and outputs it to the demodulator 23.

Figure 5B:
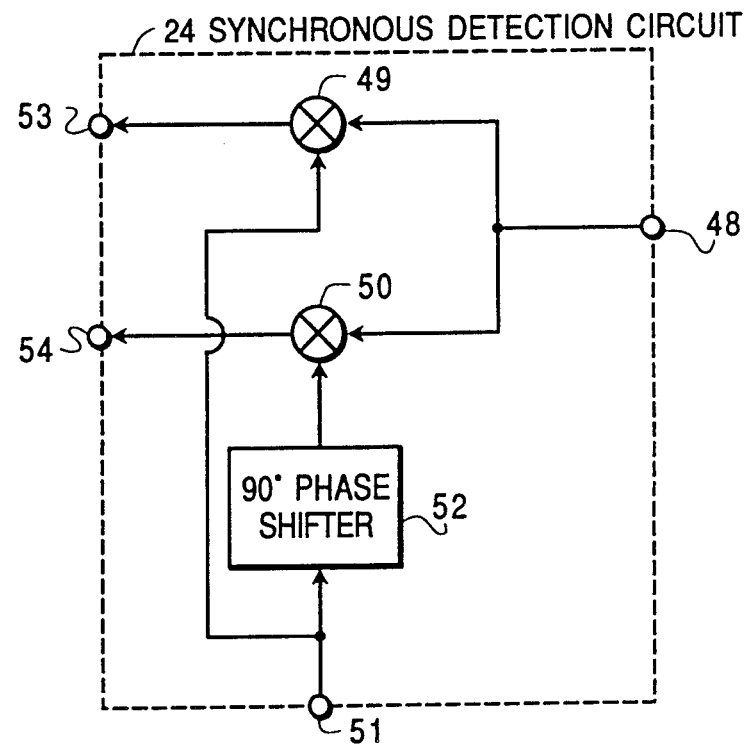

The synchronous detection circuit 24 in the demodulator 23 synchronously detects the reproduced signal inputted from the reproducing head 18 using the carrier wave reproduced by the carrier wave reproducing circuit 22. A concrete block diagram of the synchronous detection circuit 24 is shown in FIG. 5b. The reproduced signal inputted to the terminal 48 is inputted to the balanced modulators 49 and 50. Also, the carrier wave reproduced by the carrier wave reproducing circuit 22 is inputted from the terminal 51. The reproduced carrier wave inputted from the terminal 51 is as such inputted to the balanced modulator 49, and the other is, after its phase being shifted by 90° by the 90° shifter, inputted to the balanced modulator 50. With the balanced modulators 49 and 50, the reproduced signal and the reproduced carrier wave are multiplied respectively and outputted as the output signals of synchronous detection circuit 24 respectively from the terminals 53 and 54.

The 2 channel demodulated signals of the output of the synchronous detection circuit 24 are inputted to the LPFs 25 an 26, which pass only the multi-value base bands prior to modulation. The characteristic of each LPF should be so made that the combined characteristic of LPF 7 or 8 in the modulator and LPF 25 or 26 in the modulator has a roll-off characteristic free from intersymbol interference.

Figure 2B:
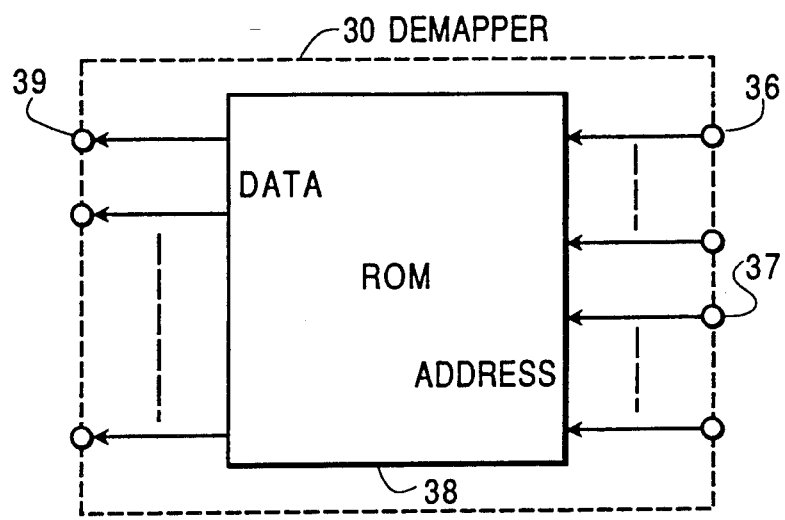

The outputs of LPFs 25 and 26 are inputted to the Analog-Digital Converters (hereinafter referred to as ADCs) 28 and 29 to be converted to digital signals, and are inputted to the demapper 30 whose concrete block diagram is shown in FIG. 2b, and the decoded data is outputted to the output terminal 31. For example, when the modulation scheme is 16 QAM, the outputs of LPFs 25 and 26 are inputted to the 2-bit ADCs 28 and 29. The 2-bit output digital signal of ADC 28 shows the result of identification of 4 areas (I1, I2, I3, I4) in the direction of I axis in FIG. 3b, and the 2-bit output digital signal of ADC 29 shows the result of identification of 4 areas (Q1, Q2, Q3, Q4) in the direction of Q axis in FIG. 3b. In other words, the outputs of a total of 4 bits of ADCs 28 and 29 show the place where the demodulation signal lies in the 16 areas formed by sectioning with the dashed lines in FIG. 3b. In the demapper 30 comprising the ROM, the 4-bit data with which the 16 areas correspond are stored, and the data corresponding to the output of ADC is outputted to the output terminal 31 as a decoding data.

As explained above, in the first embodiment, by effecting a mapping treatment so as to correct non-linear amplitude characteristics formed in the magnetic recording/reproducing process before reading, the deterioration of the S/N ratio of the reproduced demodulated signal due to the non-linear amplitude characteristics is reduced, and the data errors after demodulation can be reduced.

Figure 7:
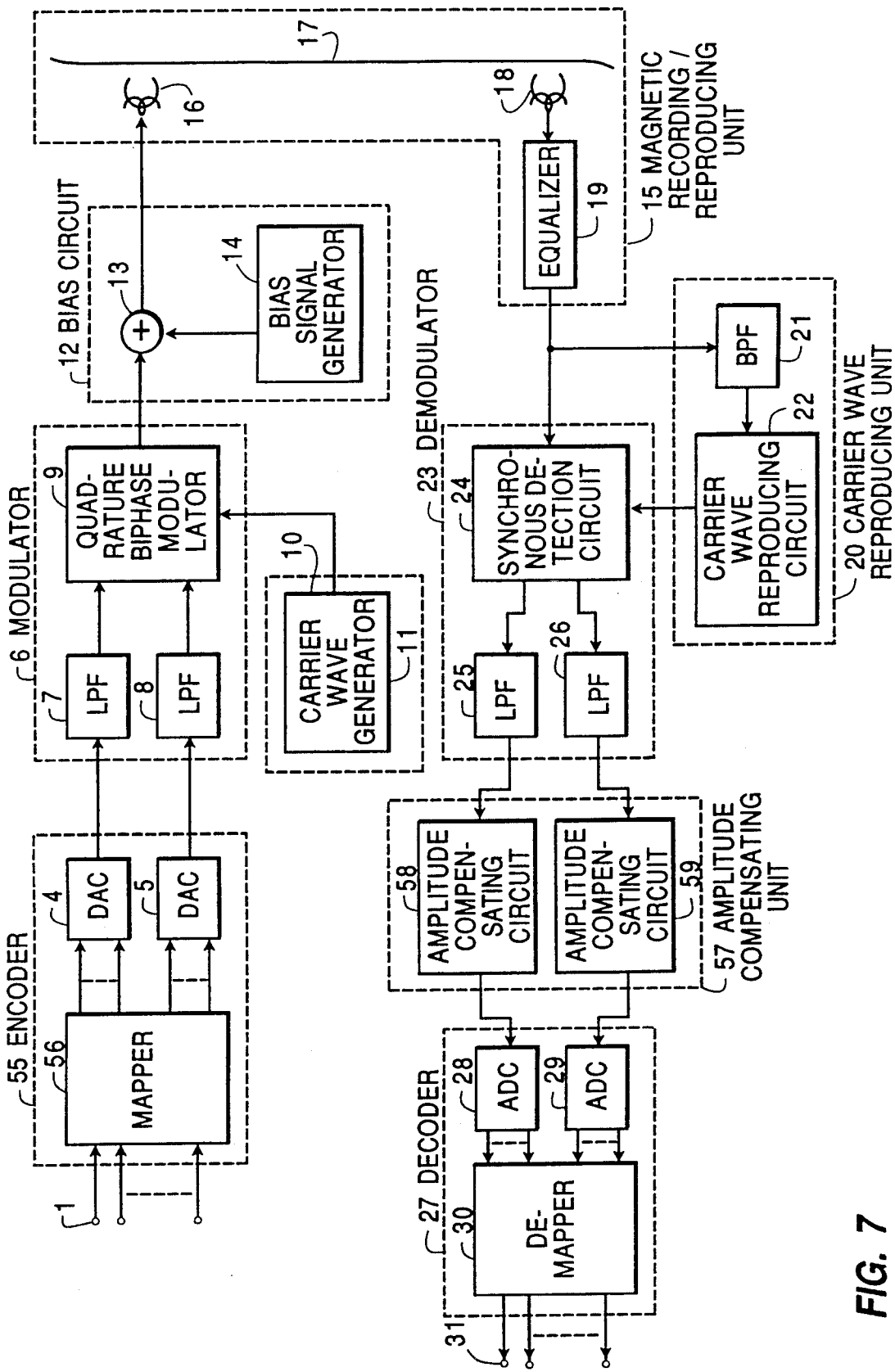
FIG. 7 is a block diagram of a digital signal magnetic recording/reproducing apparatus in accordance with a second embodiment of the present invention.

In FIG. 7 a block diagram of the digital signal magnetic recording/reproducing apparatus in accordance with the second embodiment of the present invention is shown. In FIG. 7, the difference from the embodiment of FIG. 1 is in the point of not compensating for the non-linear amplitude characteristics by the non-linear mapper 3 before recording but rather compensating for the non-linear amplitude characteristics by providing an amplitude compensating circuit after the reproduction.

The digital signal is inputted into the input terminal 1. The inputted digital signal is inputted into the encoder 55, and converted to a digital signal having two channel plural levels by the mapper 56 in the encoder 55 to be converted to multi-value digital signals by the DACs 4 and 5.

Figure 8A:
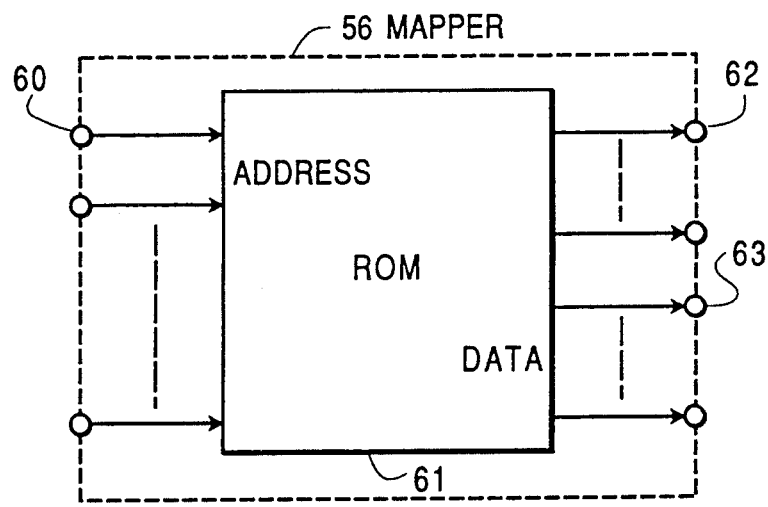
FIG. 8a is a block diagram of a demapper 56 in the digital signal magnetic recording/reproducing apparatus in the second embodiment of the present invention.

A concrete block diagram of the abovementioned mapper 56 is shown in FIG. 8a. For example, when the input from the input terminal 1 is 4 bits and the modulation scheme is 16 QAM, a signal of 4 bits is inputted into the ROM 61 as an address signal. In the ROM 61 16 two channel I and Q signal combinations are stored, from which the I and Q signals corresponding to the inputted 4 bit signals are outputted to the output terminals 62 and 63.

Figure 9A:
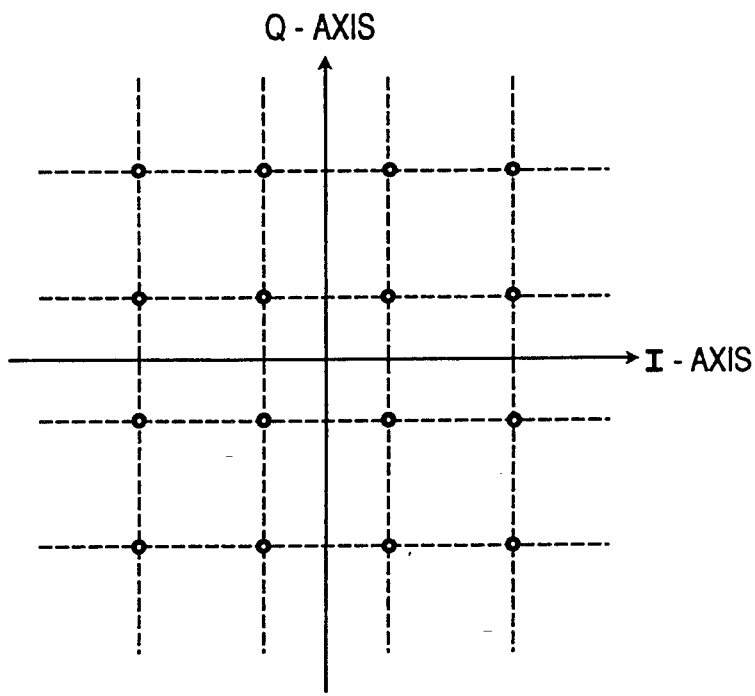
FIGS. 9a and 9b are conceptual views of a signal point arrangement during the mapper 56 in recording and the signal point position of the reproduced demodulated signal of the digital signal magnetic recording/reproducing apparatus of the present invention.

The 16 combinations of the I and Q signals correspond to the 16 points which are shown for example in lattice form in FIG. 9a.

The outputs of DACs 4 and 5 are inputted to the modulator 6. In the modulator 6, the outputs from the inputted DAC 4 and 5 are respectively inputted to the LPFs 7 and 8 and subjcted to band limitations. The outputs of LPFs 7 and 8 are inputted to the quadrature biphase modulator 9, where they are subjected to quadrature biphase modulation using the carrier wave outputted from the carrier wave generator 11 in the carrier wave generating unit 10.

A concrete block diagram of the abovementioned quadrature biphase modulator 9 is shown in FIG. 5a. It is assumed that the outputs from the carrier wave generator 11 is $C(t) = A \cdot \cos \omega_c t$, and the outputs of LPFs 7 and 8 are $d_1(t)$ and $d_2(t)$. The signals $d_1(t)$ and $d_2(t)$ are the multi-value digital signals having an n level, in which n is an optional integer. (If the input bit number of the coder 55 is 4, there are 16 combinations of the outputs of LPFs 7 and 8.) The outputs $d_1(t)$ and $d_2(t)$ of LPFs 7 and 8 are respectively inputted to the balanced modulators 42 and 43 from the terminals 40 and 41. Also, the carrier wave C(t) inputted from the terminal 44 is inputted as such to the balanced modulator 42, and the other is subjected to 90° shifting of phase with a 90° shifter 45 and inputted to the balanced modulator 43 as $A \cdot \sin \omega_c t$. With the balanced modulators 42 and 43, the LPF output and the carrier wave are respectively multiplied and inputted to the adder 46. The output of the adder 46 is outputted from the terminal 47 as an output S(t) from the quadrature biphase modulator 9, namely, it becomes, as follows:

$$S(t) = d_1(t) \cdot A \cdot \cos \omega_c t + d_2(t) \cdot A \cdot \sin \omega_c t$$

The output from the quadrature biphase modulator 9 is inputted to the bias circuit 12, and outputted with addition by the adder 13 of the bias signal outputted from the bias signal generator 14. The bias signal frequency $f_B$ with respect to the maximum frequency $f_H$ in the recording signal band is assumed to be: $f_B \geq 3 \cdot f_H$.

This relationship is shown in FIG. 6. By this relationship, entry of the cross modulation component of $f_B-2\cdot f$ into the recorded signal band is prevented. (Here, f is an optional frequency in the recording signal band.) Furthermore, the bias current is set to maximize the amplitude of the reproduced signal. If the harmonic distortion becomes large with the so set bias current value, setting may be made to the current value to maximize the composite S/N ratio including the harmonic distortion as noise. The output of the bias circuit 12 is inputted to the magnetic recording/reproducing unit 15 and recorded by the recording head 16 on the magnetic recording medium 17 (e.g., magnetic tape, magnetic disk, or the like).

The signal recorded on the magnetic recording medium 17 is output from the reproducing head 18 (which may be co-used as a recording head) and inputted to the equalizer 19 which has no group delay distortion. By the equalizer 19, the low pass and the high pass portions which were attenuated in the magnetic recording/reproducing process are accentuated to make the frequency characteristic in the magnetic recording/reproducing system nearly flat. The output of the equalizer 19 is inputted to the carrier wave reproducing unit 20 and the demodulator 23. In the carrier wave reproducing unit 20, the carrier wave component is extracted by the BPF 21 for passing the carrier wave frequency and inputted to the carrier wave reproducing circuit 22. The carrier wave reproducing circuit 22 reproduces the carrier wave and outputs it to the demodulator 23.

The synchronous detection circuit 24 in the demodulator 23 synchronously detects the reproduced signal inputted from the reproducing head 18 using the carrier wave reproduced by the carrier wave reproducing circuit 22. A concrete block diagram of the synchronous detection circuit 24 is shown in FIG. 5b. The reproduced signal inputted to the terminal 48 is inputted to the balanced modulators 49 and 50. Also, the carrier wave reproduced by the carrier wave reproducing circuit 22 is inputted from the terminal 51. The reproduced carrier wave inputted from the terminal 51 is as such inputted to the balanced modulator 49, and the other is, after its phase being shifted by 90° by the 90° shifter 52, inputted to the balanced modulator 50. With the balanced modulators 49 and 50, the reproduced signal and the reproduced carrier wave are multiplied respectively and outputted as the output signals of synchronous detection circuit 24 from the terminals 53 and 54, respectively.

The 2-channel demodulated signals of the output of the synchronous detection circuit 24 are inputted to the LPFs 25 and 26, which pass only the multi-value basebands prior to modulation. The characteristic of each LPF should be so made that the combined characteristic of LPF 7 or 8 in the modulator and LPF 25 or 26 in the modulator has a roll-off characteristic free from intersymbol interference.

Figure 10:
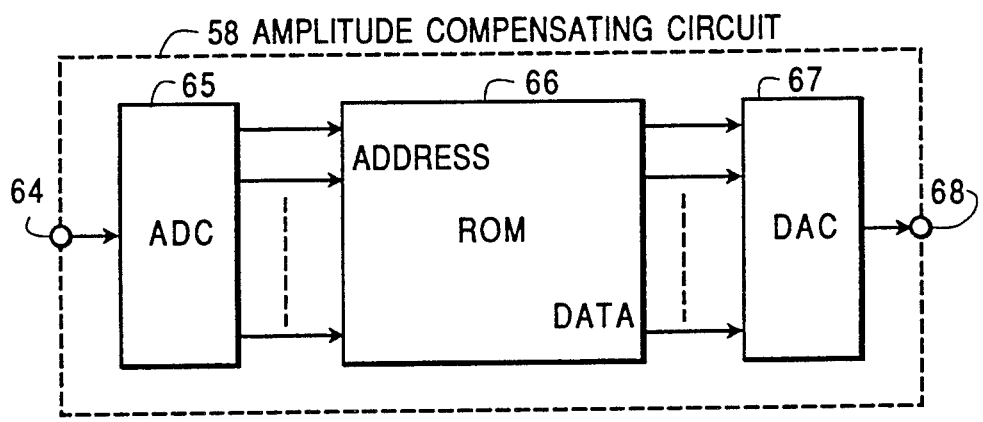
FIG. 10 is a block diagram of an amplitude compensating circuit 58 in the digital signal magnetic recording/reproducing apparatus of the present invention.
Figure 9B:
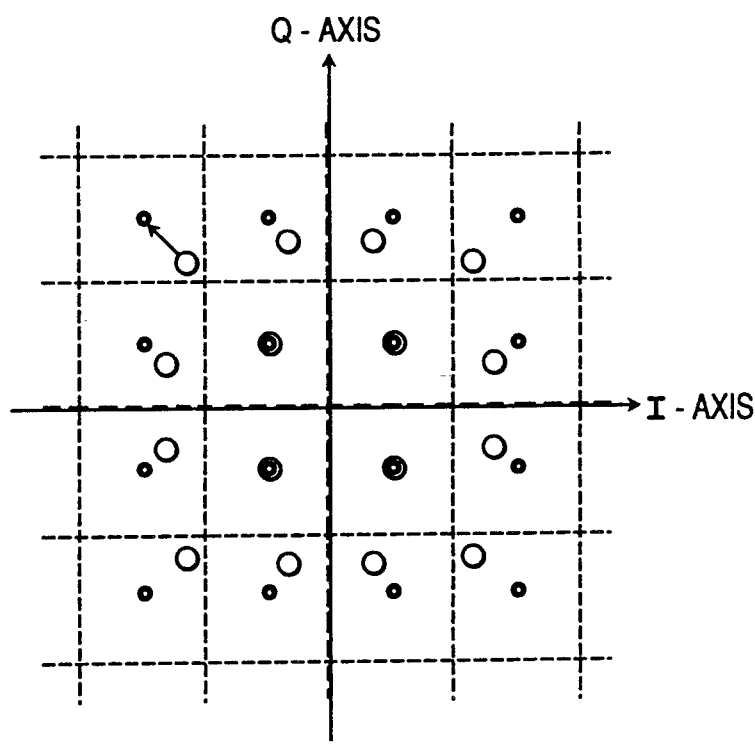
Figure 11:
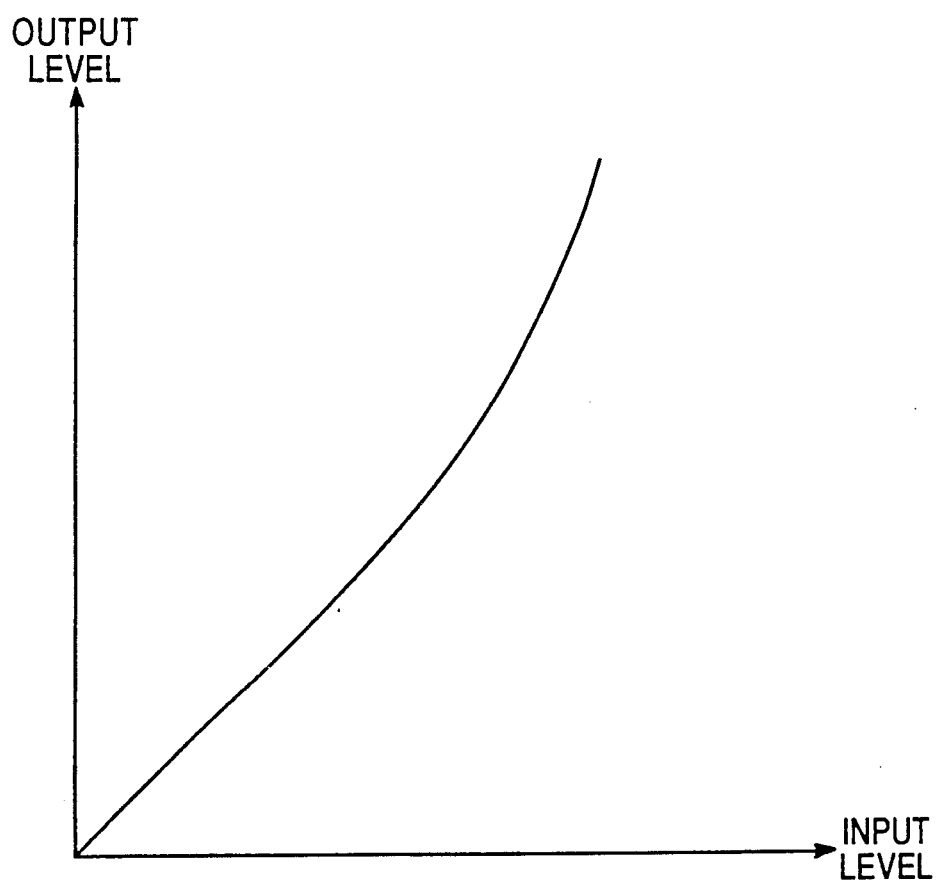
FIG. 11 is a conceptual view showing an input and output characteristic of the amplitude compensating circuit 58 in the digital signal magnetic recording/reproducing apparatus of the present invention.

The reproduced demodulated signals which are the outputs of LPFs 25 and 26 become the distorted signals toward the basic point as shown by the open circles in FIG. 9b, under effect of the amplitude non-linear characteristic in the magnetic recording/reproducing process. A means of compensating those distorted reproduced demodulated signals to the positions as shown by the solid dots in FIG. 9b are the amplitude compensating circuits 58 and 59, whose concrete block diagrams are shown in FIG. 10. The demodulated signal inputted to the input terminal 64 is converted to a digital signal by the ADC 65, and inputted to the ROM 66 as an address signal. In the ROM 66, the input address and the output data are stored so that they have the relationship as shown in FIG. 11, and the data signal corresponding to the address signal is outputted. The output signal of ROM 66 is inputted to DAC 67, and the compensated demodulated signal is outputted. The amplitude compensating circuit 59 also has the same construction as the amplitude compensating circuit 58.

The outputs of the amplitude compensating circuits 58 and 59 are inputted to the ADCs 28 and 29 to become digital signals, and inputted to the demapper 30 whose concrete block diagram is shown in FIG. 2b, and the decoded data is outputted to the output terminal 31. For example, when the modulation scheme is 16 QAM, the outputs of the amplitude compensating circuits 58 and 59 are inputted to the 2-bit ADCs 28 and 29. The 2-bit output digital signal of ADC 28 shows the result of identification of 4 areas (I1, I2, I3, I4) in the direction of I axis in FIG. 3b, and the 2-bit output digital signal of ADC 29 shows the result of identification of 4 areas (Q1, Q2, Q3, Q4) in the direction of Q axis in FIG. 3b. In other words, the outputs of total 4 bits of ADCs 28 and 29 show the place where the demodulation signal lies in the 16 areas formed by sectioning with the dashed lines in FIG. 3b. In the demapper 30 comprising the ROM, the 4-bit data with which the 16 areas correspond are stored, and the data corresponding to the output of ADC is outputted to the output terminal 31 as a decoding data.

As explained above, according to the second embodiment, by increasing the multi-value numbers of the input digital signals, error correction coding is performed, and by providing a coder 102 and a decoder 107 for converting into I signal and Q signal, the error rate can be improved against the deterioration of S/N ratio which occurs in magnetic recording and reproducing.

Furthermore, in the second embodiment, by correcting the non-linear amplitude distortion which was formed in the process of magnetic recording and reproducing after the reproduction by means of the amplitude compensating circuit, deterioration of S/N ratio of the reproduced demodulated signal can be reduced, and the data errors after the demodulation can be reduced.

Although no detailed description has been made on the input bit number of DAC of the modulation unit in the embodiments (first and second) in the present invention, the input bit number of DAC may be an optional integer. Furthermore, although a construction using the carrier reproducing circuit was not shown such as Costas scheme or the clock reproducing circuit, by combined use of them, the reproduction precision can be elevated. Furthermore, by employing the differentiated coded digital signal as the input digital signal, phase compensation of the carrier wave is simplified in the carrier wave reproducing unit.

In the embodiments (first and second) of the present invention, explanation has been made on the case of using the multi-value quadrature amplitude modulation. However, similar effect can be obtained in other modulation schemes such as Amplitude Phase Shift Keying (APSK), Phase Shift Keying (PSK), Frequency Shift Keying (FSK), and the like.

What is claimed is:

1. A digital signal magnetic recording/reproducing apparatus comprising:

a non-linear mapping means for producing two channel signals showing a predetermined point in a constellation corresponding to a value of an input digital data, said predetermined point having been set to have an inverse characteristic with respect to non-linear amplitude characteristics of a magnetic head and magnetic recording medium system;

a carrier generating means for generating a carrier;

an amplitude phase modulation means for subjecting the two-channel signals from said mapping means to quadrature biphase modulation using said carrier to generate a modulated signal;

a magnetic recording/reproducing means including a magnetic head for recording said modulated signal on a magnetic recording medium, and for reproducing the recorded signal;

a carrier reproducing means for reproducing a carrier from the reproduced signal from said magnetic recording/reproducing means;

a demodulation means for demodulating the reproduced signal from said magnetic recording/reproducing means using the carrier reproduced by said carrier reproducing means; and a decoding means for decoding an output of said demodulation means to obtain output digital data.

2. An apparatus according to claim 1, wherein said amplitude phase modulation means performs quadrature amplitude modulation.

3. An apparatus according to claim 1, further comprising a bias signal generating means for generating a bias signal, and an adder means for adding the bias signal to the modulated signal from said amplitude phase modulation means, an output of said adder means being fed to the magnetic recording/reproducing means.

4. An apparatus according to claim 3, wherein said bias signal generating means generates a bias signal having a frequency which is at least 3 times the highest frequency in a frequency band of the modulated signal area, and wherein the recording current value of the bias signal is set to such a value that the amplitude of the reproduced signal from said magnetic recording/reproducing means is maximized.

5. An apparatus according to claim 3, wherein said bias signal generating means generates a bias signal having a frequency of at least 3 times the highest frequency in a frequency band of the modulated signal, and wherein the recording current value of the bias signal is set to such a value that the signal to noise ratio which includes as noise a harmonic distortion of the reproduced signal from said magnetic recording/reproducing means is maximized.

6. A digital signal magnetic recording/reproducing apparatus comprising:

a non-linear mapping means for producing two channel signals showing a predetermined point in a constellation corresponding to a value of an input digital data;

a carrier generating means for generating a carrier;

an amplitude phase modulation means for subjecting the two-channel signals from said mapping means to quadrature biphase modulation using said carrier to generate a modulated signal;

a magnetic recording/reproducing means including a magnetic head for recording said modulated signal on a magnetic recording medium, and for reproducing the recorded signal;

a carrier reproducing means for reproducing a carrier from the reproduced signal from said magnetic recording/reproducing means;

a demodulation means for demodulating the reproduced signal from said magnetic recording/reproducing means using the carrier reproduced by said carrier reproducing means;

an amplitude non-linear compensating means for compensating the demodulated signal from said demodulating means in accordance with an inverse characteristic with respect to non-linear amplitude characteristics of a system including said magnetic recording/reproducing means and said magnetic recording medium; and a decoding means for decoding an output of said amplitude non-linear compensating means to obtain output digital data.

7. An apparatus according to claim 6, wherein said amplitude phase modulation means performs quadrature amplitude modulation.

8. An apparatus according to claim 6, further comprising a bias signal generating means for generating a bias signal, and an adder means for adding the bias signal to the modulated signal from said amplitude phase modulation means, an output of said adder means being fed to the magnetic recording/reproducing means.

9. An apparatus according to claim 8, wherein said bias signal generating means generates a bias signal having a frequency which is at least 3 times the highest frequency in a frequency band of the modulated signal, and wherein the recording current value of the bias signal is set to such a value that the amplitude of the reproduced signal from said magnetic recording/reproducing means is maximized.

10. An apparatus according to claim 8, wherein said bias signal generating means generates a bias signal having a frequency of at least 3 times the highest frequency in a frequency band of the modulated signal, and wherein the recoding current value of the bias signal is set to such a value that the signal to noise ratio which includes as noise the harmonic distortion of the reproduced signal from said magnetic recoding/reproducing means is maximized.

* * * * *

UNITED STATES PATENT AND TRADEMARK OFFICE
CERTIFICATE OF CORRECTION

PATENT NO. : 5,062,007

DATED : October 29, 1991

INVENTOR(S) : Etsuto NAKATSU; Hiroaki SHIMAZAKI; Toyohiko MATSUTA; Masafumi SHIMOTASHIRO and Masaaki KOBAYASHI It is certified that error appears in the above-identified patent and that said Letters Patent is hereby corrected as shown below:

On the title page:
  Second Column, Fourth Line, change "Lowe, Price, LeBlanc & Becker" to --Wenderoth, Lind & Ponack--.

Signed and Sealed this

Sixth Day of April, 1993

*Attest:*

STEPHEN G. KUNIN

*Attesting Officer*    Acting Commissioner of Patents and Trademarks